United States Patent
Wu et al.

(10) Patent No.: US 12,301,115 B2
(45) Date of Patent: May 13, 2025

(54) TWO-PHASE SMART POWER STAGE (SPS) FOR MULTIPHASE BUCK CONVERTERS

(71) Applicant: Reed Semiconductor Corporation, Warwick, RI (US)

(72) Inventors: Wenkai Wu, East Greenwich, RI (US); Weidong Zhu, East Lyme, CT (US); Qian Chen, Cary, NC (US)

(73) Assignee: Reed Semiconductor Corporation, Warwick, RI (US)

( * ) Notice: Subject to any disclaimer, the term of this patent is extended or adjusted under 35 U.S.C. 154(b) by 262 days.

(21) Appl. No.: 17/983,703

(22) Filed: Nov. 9, 2022

(65) Prior Publication Data

US 2023/0188028 A1     Jun. 15, 2023

Related U.S. Application Data

(60) Provisional application No. 63/287,905, filed on Dec. 9, 2021.

(51) Int. Cl.
*H02M 3/158*     (2006.01)
*H02M 1/00*     (2006.01)
*H02M 1/14*     (2006.01)

(52) U.S. Cl.
CPC ....... *H02M 3/1584* (2013.01); *H02M 1/0054* (2021.05); *H02M 1/0095* (2021.05); *H02M 3/1586* (2021.05); *H02M 1/14* (2013.01)

(58) Field of Classification Search
CPC .... H02M 3/1584; H02M 3/1586; H02M 1/14; H02M 1/15; H02M 1/0095; H02M 1/0048; H02M 1/0054; H02M 3/005
See application file for complete search history.

(56) References Cited

U.S. PATENT DOCUMENTS

| | | | |
|---|---|---|---|
| 2008/0315982 A1* | 12/2008 | Wei ..................... | H02M 7/003 336/155 |
| 2016/0261190 A1* | 9/2016 | Shenoy ................ | H02M 1/14 |
| 2020/0321872 A1* | 10/2020 | Upadhyaya ......... | H02M 3/157 |

OTHER PUBLICATIONS

A 5 MHZ, 12 V, 10 A, monolithically integrated two-phase series capacitor buck converter, 2016 IEEE Applied Power Electronics Conference and Exposition (APEC) (Year: 2016).*
An Interleaved Series-Capacitor Tapped Buck Converter for High Step-Down DC/DC Application, IEEE Transactions on Power Electronics, vol. 34, No. 7, Jul. 2019 (Year: 2019).*

* cited by examiner

*Primary Examiner* — Alex Torres-Rivera
(74) *Attorney, Agent, or Firm* — AP3 Law Firm PLLC

(57) ABSTRACT

A multiphase buck converter that includes smart two-phase power stages for reducing switching losses. Each of the smart power stages includes a first high side switch, a second high side switch, a first low side switch, a second low side switch, a switching capacitor, a first inductor, and a second inductor. The exemplary multiphase buck converter includes two such smart power stages and a multiphase controller for generating PWM signals for driving the two smart power stages synchronously.

12 Claims, 4 Drawing Sheets

TWO-PHASE SMART POWER STAGE (SPS) FOR MULTIPHASE BUCK CONVERTERS

CROSS-REFERENCE TO RELATED APPLICATIONS

This application claims priority from a U.S. Provisional Patent Appl. No. 63/287,905 filed on Dec. 9, 2021, which is incorporated herein by reference in its entirety.

FIELD OF INVENTION

The present invention relates to a smart power stage for multiphase DC/DC converters, and more particularly, the present invention relates to a smart power stage for multi-phase buck converters.

BACKGROUND

DC/DC converters are known in the art to step-up and step-down DC voltage. The step-down converters are commonly referred to as Buck converters. The buck converters belong to a class of switched-mode power supply (SMPS) that contains transistors, inductors, and capacitors. A buck converter uses a transistor as a switch that alternately connects and disconnects the input voltage to an inductor. The time for which a switch is ON divided by the total duration is referred to as the duty cycle. A basic buck converter topology has a transistor and a diode. The diode can be replaced by the second transistor in synchronous buck converters. MOSFETS have been used in place of transistors because of their higher efficiency. Also, Pulse width modulation (PWM) is generally used to set the switch ON time based on a feedback loop. The output voltage can be directly regulated by changing the switch ON time.

A single-phase buck converter is suitable for low voltage converter applications for limited current capacity. Higher current capacity requires large component sizes and better heat dissipation because of a large amount of heat generated. One approach to handle large current capacities is to use a multiphase buck converter. The multiphase buck converter has two or more buck converters connected in parallel and the phases are interleaved. The multi-phase buck converter has several advantages, such as reducing ripple currents, hotspots, decreasing output filter requirements, improved Load-transient performance, and many others. However, the multiphase buck converters suffer from one major drawback of switching loss which can become significant in the majority of the applications.

There currently exists an industry need for an improved circuit topology for multiphase buck converters that have lower switching losses and all the advantages of the multi-phase buck converters.

SUMMARY OF THE INVENTION

The principal object of the present invention is therefore directed to a two-phase smart power stage for multi-phase step-down DC-DC converter that overcomes the aforesaid drawback of multi-phase buck converters by having lower switching losses.

It is another object of the present invention that the switching stress on each switch can be reduced by half.

It is still another object of the present invention that the inductor current ripple, and thus the output voltage ripple can be reduced.

It is yet another object of the present invention to enable the use of low voltage rating devices for low side MOSFETs with the improved figure of merit and thus further improve the efficiency.

It is a further object of the present invention to further miniaturize the multi-phase DC-DC converts.

It is still a further object of the present invention to shield the output load against damage caused by high side FET failure.

It is an additional object of the present invention that the current in the circuit can be automatically balanced.

In one aspect, disclosed is a two-phase smart power stage for multi-phase step-down DC-DC converter, wherein in a typical multi-phase step-down DC-DC converter comprises a first two-phase smart power stage, the first two-phase smart power stage comprises a first high side switch, a second high side switch, a first low side switch, a second low side switch, a first switching capacitor, a first inductor, and a second inductor; and a second two-phase smart power stage, the second two-phase smart power stage comprises a third high side switch, a fourth high side switch, a third low side switch, a fourth low side switch, a second switching capacitor, a third inductor, and a fourth inductor. A first leg of the first high side switch and a first leg of the third high side switch are electrically connected to a first terminal, a second leg of the first high side switch, a first leg of the first switching capacitor, and a first leg of the second high side switch are electrically connected to a second terminal, a second leg of the first switching capacitor, a first leg of the first low side switch, and a first leg of the first inductor are electrically connected to a third terminal, a second leg of the first inductor is electrically connected to a fourth terminal, a second leg of the second high side switch, a first leg of the second low side switch, and a first leg of the second inductor are electrically connected to a fifth terminal, a second leg of the second inductor is electrically connected to the fourth terminal, a second leg of the third high side switch, a first leg of the second switching capacitor, and a first leg of the fourth high side switch are electrically connected to a sixth terminal, a second leg of the second switching capacitor, a first leg of the third low side switch, and a first leg of the third inductor are electrically connected to a seventh terminal, a second leg of the third inductor is electrically connected to the fourth terminal, a second leg of the fourth high side switch, a first leg of the fourth low side switch, and a first leg of the fourth inductor are electrically connected to an eight terminal, and a second leg of the fourth inductor is electrically connected to the fourth terminal. The first terminal is further electrically connected to a voltage input source. The fourth terminal is further electrically connected to a capacitor and a load. The first high side switch, the second high side switch, the first low side switch, the second low side switch, the third high side switch, the fourth high side switch, the third low side switch, the fourth low side switch are MOSFETs. The multi-phase step-down DC-DC converter further comprises a multiphase controller, wherein the multiphase controller is configured to generate an interleaved first phase pulse-duration modulation signal for the first two-phase smart power stage and second phase pulse-duration modulation signal for the second two-phase smart power stage.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
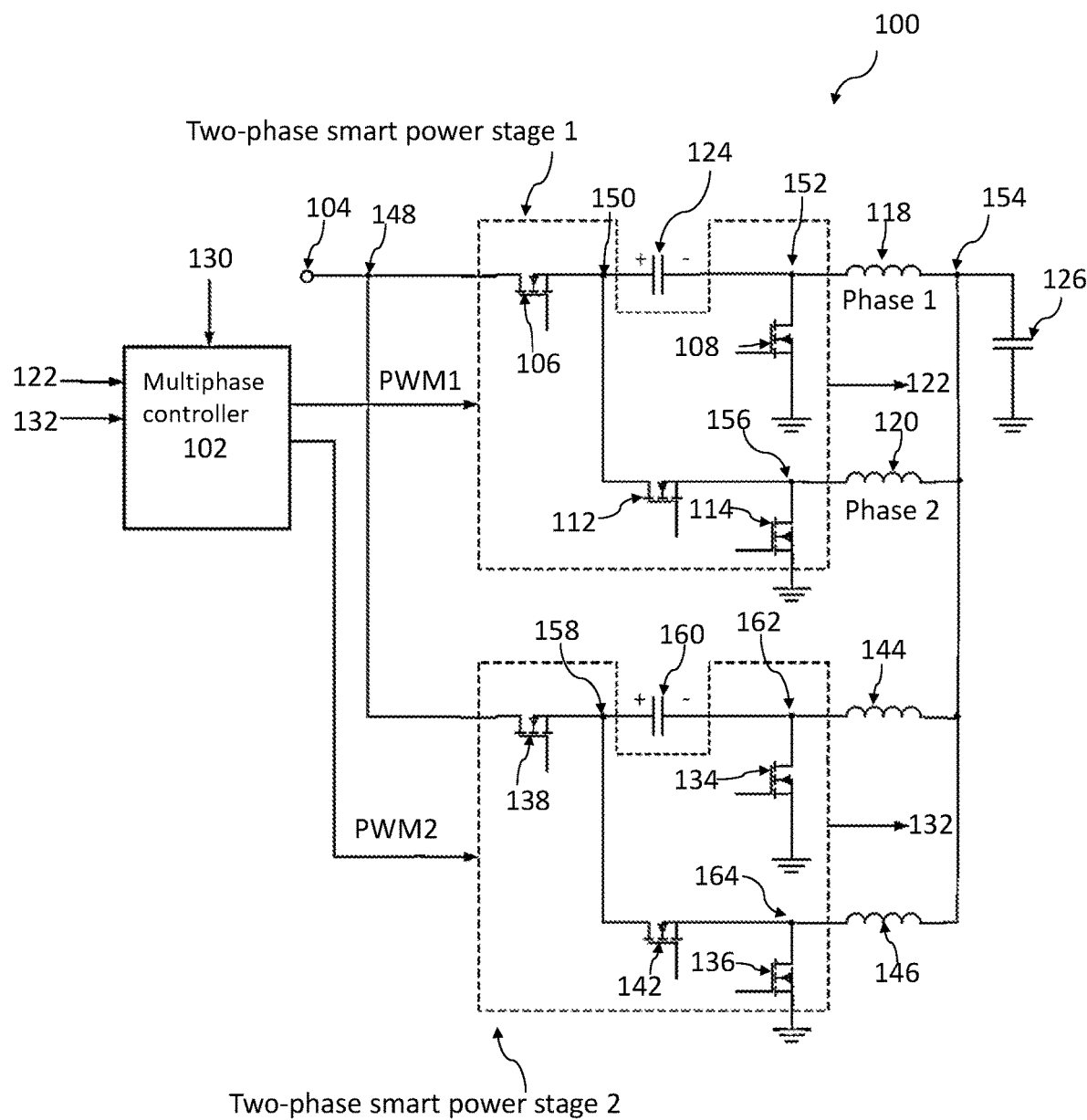
FIG. 1 is a circuit diagram showing a four-phase multi-phase step-down DC-DC converter adopting the two-phase smart power stages, according to an exemplary embodiment of the present invention.

Disclosed is a two-phase smart power stage for multiphase step-down DC-DC converter that can be used in high current applications, such as power supplies for processors, FPGA, ASIC, etc. Referring to FIG. 1 which is a circuit diagram for an exemplary embodiment of a multi-phase step-down DC-DC converter 100 comprising the disclosed two-phase smart power stages. The circuit diagram in FIG. 1 shows two two-phase smart power stages i.e., smart power stage 1 and smart power stage 2, wherein each smart power stage has two phases. The two smart power stages are shown connected to a common voltage input (VIN) 104. Also, both the smart power stages can be seen connected to a multi-phase controller 102. The multiphase controller 102 can send the PWM signals to the two smart power stages. Each smart power stage includes a transistor as a first high side switch. The first high side switch can preferably be a MOSFET. Each smart power stage can also include a first low side switch which can also preferably be a MOSFET. Each smart power stage can also include a switching capacitor electrically coupled to the first high side switch and the first low side switch. Each smart power stage can also include a second high side switch and a second low side switch. Each smart power stage can also connect to a first inductor and a second inductor for the two phases respectively.

The multi-phase step-down DC-DC converter has a voltage input 104, a first high side switch 106 of smart power stage 1, and a first high side switch 138 of smart power stage 2 all electrically connected to a first terminal 148. A second leg of the first high side switch 106, a first leg of a first switching capacitor 124, and a first leg of a second high side switch 112 can be electrically connected to a second terminal 150. The first low side switch 108, the second leg of the first switching capacitor 124, and the first inductor 118 are also electrically connected to the third terminal 152. The opposite terminal of the first inductor 118 can also be connected to a fourth terminal 154. The second high side switch 112 and the second low side switch 114 can be connected to a fifth terminal 156. The second inductor 120 at one end can be connected to the fifth terminal 156 and another end of the second inductor 120 can be connected to the fourth terminal 154. The capacitor 126 can be connected to the fourth terminal 154. The fourth terminal 154 can be connected to the load and has a voltage output.

Referring to the second smart power stage of the multi-phase step-down DC-DC converter 100 shown in FIG. 1, the third high side switch 138 and the second switching capacitor 160 can be connected to a sixth terminal 158. The other end of the second switching capacitor 160 and the third low side switch 134 can be connected to a seventh terminal 162. The third inductor 144 can at one terminal be connected to the seventh terminal 162 while the other terminal of the third inductor 144 can be connected to the fourth terminal 154. Fourth high side switch 142 at one end can be connected to the sixth terminal 158 and another end of the fourth high side switch 142 can be connected to an eight terminal 164. Similarly, a fourth low side switch 136 at one end can be connected to the eight terminal 164 and another end of the fourth low side switch 136 can be ground. A fourth inductor 146 at one end can be connected to the eighth terminal 164 and another end of the fourth inductor 146 can be connected to the fourth terminal 154. The second smart power stage or any further stages can have the same topology as described above for the first smart power stage and all the smart power stages can be connected to the voltage input 104 and the voltage output 154.

The first switching capacitor 124 is inserted between the first high side switch 106 and the first low side switch 108, and the drain of the second high side switch 112 is connected to the source of the first high side switch 106, to reduce the voltage during switching, resulting in reduced power loss and improved efficiency. The switches can be operated by a gate driver circuit which can receive control signals from the multiphase controller 102. The multiphase controller 102 can send a single PWM signal to each smart power stage and accordingly the MOSFETs can be turned on/off to convert the input voltage to a lower output voltage $V_{out}$. Each smart power stage can receive the PWM signal from the multiphase controller and distribute it to the two phases of the smart power stage sequentially. The multi-phase controller can receive the $V_{out}$ feedback 130 and determine the duty cycle of PWM. The current flowing through the circuit can be sensed by a current sense integration circuit (not shown), the current sense integration circuit can sense the current of each phase of the two phases of the smart power stage and sum it up and then send the combined signal to the multi-phase controller. This current signal can be used for control, monitoring, or protection purposes. FIG. 1 shows the first combined signal 122 from smart power stage 1 and the second combined signal 132 from smart power stage 2.

Figure 2:
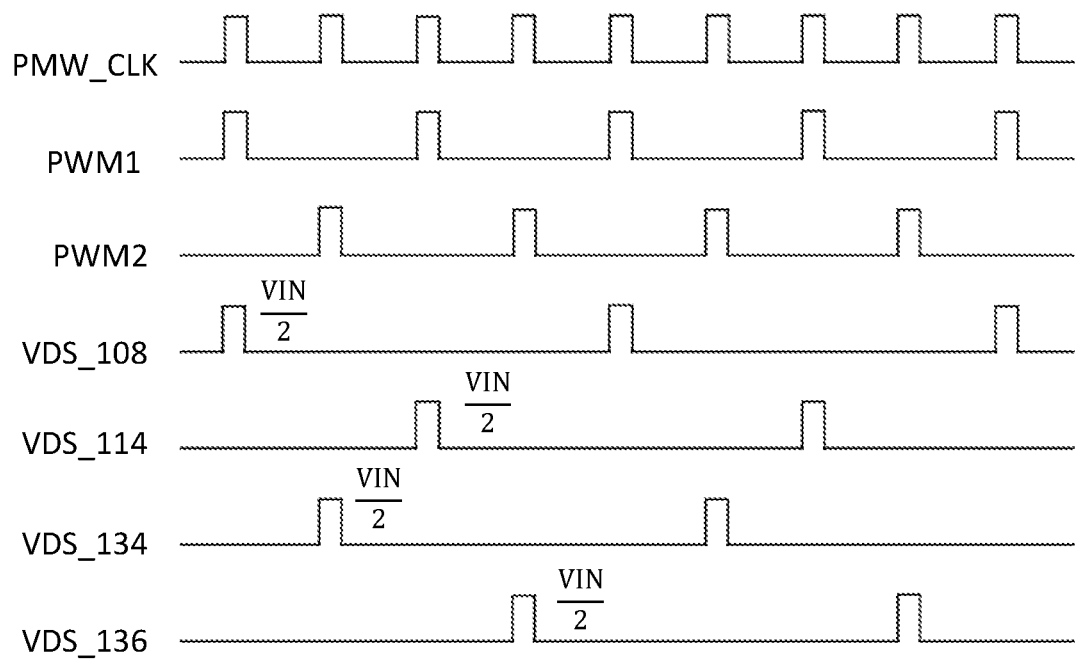
FIG. 2 shows the PWM and switch node Waveforms for the multi-phase step-down DC-DC converter, according to an exemplary embodiment of the present invention.

In operation, the first high side switch 106 can be turned on for a predefined duration based on the PWM signal, and the inductor and the capacitor can be charged in the predefined duration. The voltage across the switching capacitor 124 can be half of the Voltage input. The switch node voltages are shown in FIG. 2. Then the first high side switch 106 can be turned off and the second high side switch 112 can be turned on. Now the capacitor can act as the voltage input for the second high side switch 112.

Referring to FIG. 2 which shows the waveform during steady-state operation. The multi-phase controller sends PWM signals to both the smart power stages shown as PWM1 and PWM2. PWM1 is sent to the first smart power stage, which includes two phases, and PWM2 is sent to the second smart power stage which also includes two phases. Using the smart power stage that receives the PWM signal (PWM1 or PWM2) from the multi-phase controller, it processes the PWM signal, and sends the 1st PWM signal to phase 1, and sends the 2nd PWM signal to phase 2. In a steady-state operation, these two phases are 180-degree interleaved. When phase 1 receives the PWM high signal, it turns on the first high side switch 106 and turns off the first low side switch 108. When the PWM signal goes low, the first high side switch 106 is turned off and the first low side switch 108 is turned on. When phase 2 receives the PWM high signal, the second high side switch 112 is turned on, and the second low side switch 114 is turned off. When the PWM signal goes low, the second high side switch is turned off, and the second low side switch is turned on.

During steady-state operation, the voltage across the switching capacitors is about half of the input voltage VIN. At the moment 106 turns on, the voltage across VDS of 106 is VIN/2 since the voltage at the negative terminal of 124 is close to zero. It can also be derived that the voltage across 112 during switching is also VIN/2, since the positive terminal of 124 is VIN/2 and the drain voltage of 114 is close to zero. Therefore, the switching loss is reduced for both the switches i.e., 106 and 112, because of the reduced voltage stress during switching.

The first low side switch 108 and the second low side switch 114 experience zero voltage switching, same as prior art. However, since the maximum voltage experienced by the first low side switch 108 and the second low side switch 114 is VIN/2 instead of VIN as in the prior art, the first low side switch 108 and the second low side switch 114 can be designed with reduced breakdown voltage with lower on-resistance (Rdson) with the same silicon size to further improve efficiency. Also, the Coss loss is reduced because of reduced VIN $$\left( \text{Coss loss} = \frac{1}{2} \times f_{sw} \times \text{Coss} \times VIN^2 \right).$$

FIG. 2 shows the reduced switch node voltages at the switches 108, 114, 134, and 136 shown in FIG. 1.

Figure 3:
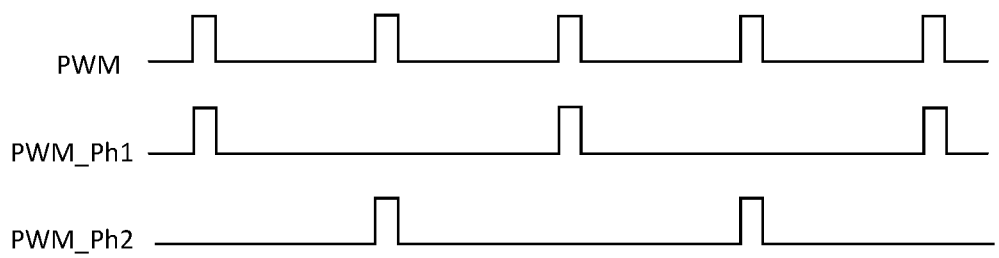
FIG. 3 shows the waveform of the PWM distribution circuit, according to an exemplary embodiment of the present invention.
Figure 4:
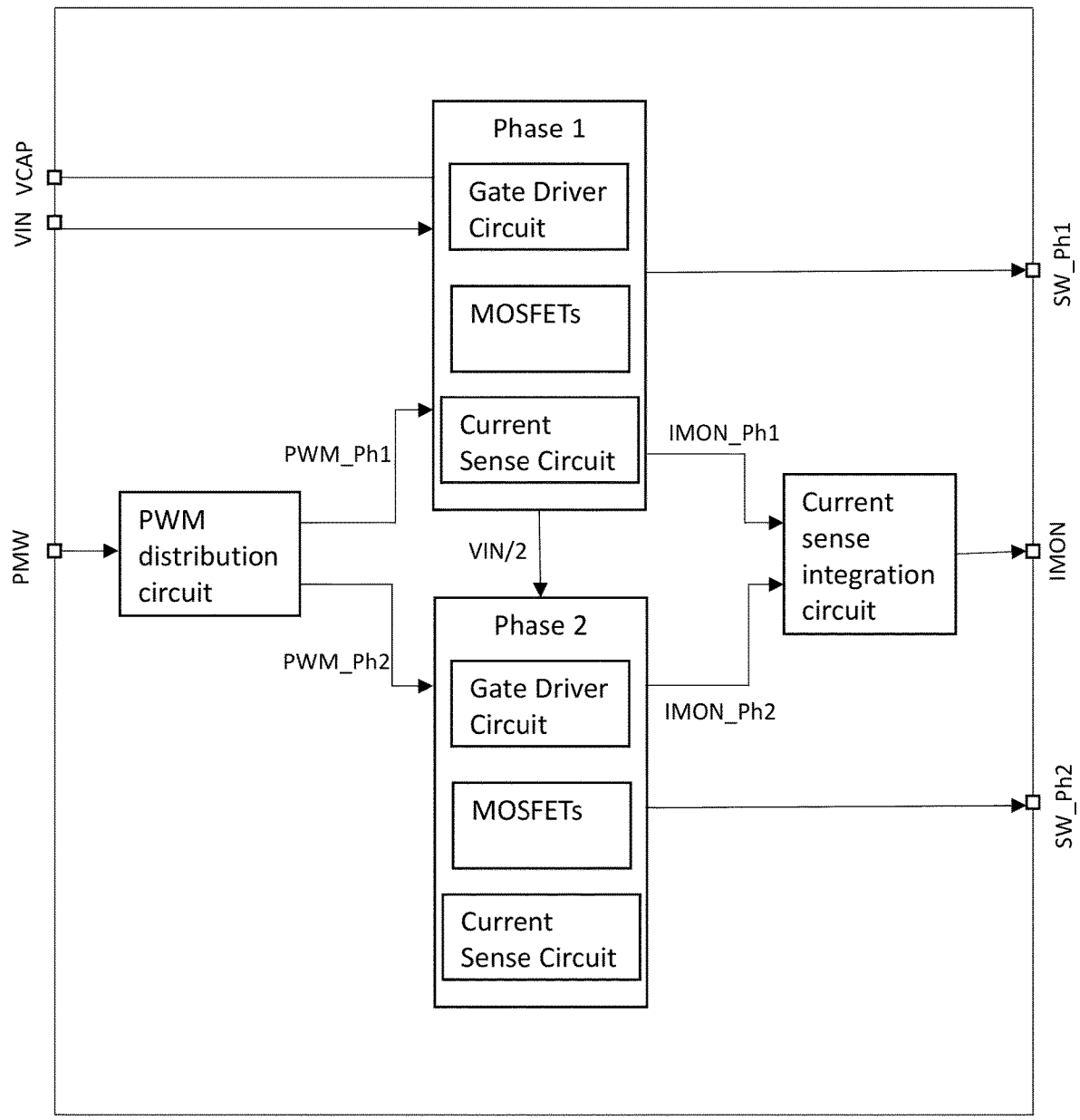
FIG. 4 is a block diagram of the two-phase smart power stage, according to an exemplary embodiment of the present invention.

FIG. 3 shows the waveform of the PWM distribution circuit. The two-phase smart power stage comprises of the two phases, each phase has its own gate drive circuit, current sense circuit and MOSFETs. Besides this, the switching capacitor circuit divides the input voltage in half for each of the switching elements (MOSFETs). The PWM distribution circuit receives the PWM signal from the controller and distributes it to the two phases inside the smart power stage sequentially. The current sense integration circuit receives the current sense signals from each phase and integrates them to a summed current signal and sends them to the multi-phase controller. FIG. 4 is a block diagram which illustrates an exemplary embodiment of the disclosed two-phase smart power stage.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A multi-phase step-down DC-DC converter with two-phase smart power stages, wherein the multi-phase step-down DC-DC converter comprises:
    a first two-phase smart power stage, the first two-phase smart power stage comprises a first high side switch, a second high side switch, a first low side switch, a second low side switch, a first switching capacitor, a first inductor, and a second inductor;
    a second two-phase smart power stage, the second two-phase smart power stage comprises a third high side switch, a fourth high side switch, a third low side switch, a fourth low side switch, a second switching capacitor, a third inductor, and a fourth inductor; and
    a multiphase controller configured to generate interleaved a first pulse width modulation signal for the first two-phase smart power stage and a second pulse width modulation signal for the second two-phase smart power stage,
    wherein:
    a first leg of the first high side switch and a first leg of the third high side switch are electrically connected to a first terminal,
    a second leg of the first high side switch, a first leg of the first switching capacitor, and a first leg of the second high side switch are electrically connected to a second terminal,
    a second leg of the first switching capacitor, a first leg of the first low side switch, and a first leg of the first inductor are electrically connected to a third terminal,
    a second leg of the first inductor is electrically connected to a fourth terminal,
    a second leg of the second high side switch, a first leg of the second low side switch, and a first leg of the second inductor are electrically connected to a fifth terminal, a second leg of the second inductor is electrically connected to the fourth terminal, a second leg of the third high side switch, a first leg of the second switching capacitor, and a first leg of the fourth high side switch are electrically connected to a sixth terminal, a second leg of the second switching capacitor, a first leg of the third low side switch, and a first leg of the third inductor are electrically connected to a seventh terminal, a second leg of the third inductor is electrically connected to the fourth terminal, a second leg of the fourth high side switch, a first leg of the fourth low side switch, and a first leg of the fourth inductor are electrically connected to an eighth terminal, and a second leg of the fourth inductor is electrically connected to the fourth terminal, and wherein the multiphase controller is configured such that:

leading edges of a first pulse and a second pulse of a drain-to-source voltage of the first low side switch are aligned with leading edges of a first pulse and a third pulse of the first pulse width modulation signal, respectively;

leading edges of a first pulse and the second pulse of a drain-to-source voltage of the second low side switch are aligned with leading edges of a second pulse and a fourth pulse of the first pulse width modulation signal, respectively, and wherein the first pulse, the second pulse, the third pulse and the fourth pulse of the first pulse width modulation signal are four consecutive pulses;

leading edges of a first pulse and a second pulse of a drain-to-source voltage of the third low side switch are aligned with leading edges of a first pulse and a third pulse of the second pulse width modulation signal, respectively; and leading edges of a first pulse and the second pulse of a drain-to-source voltage of the fourth low side switch are aligned with leading edges of a second pulse and a fourth pulse of the second pulse width modulation signal, respectively, and wherein the first pulse, the second pulse, the third pulse and the fourth pulse of the second pulse width modulation signal are four consecutive pulses.

2. The multi-phase step-down DC-DC converter with the two-phase smart power stages according to claim 1, wherein the first terminal is further electrically connected to a voltage input source.

3. The multi-phase step-down DC-DC converter with the two-phase smart power stages according to claim 1, wherein the fourth terminal is further electrically connected to a capacitor and a load.

4. The multi-phase step-down DC-DC converter with the two-phase smart power stages according to claim 1, wherein the first high side switch, the second high side switch, the first low side switch, the second low side switch, the third high side switch, the fourth high side switch, the third low side switch, the fourth low side switch are MOFSETs.

5. The multi-phase step-down DC-DC converter with the two-phase smart power stages according to claim 1, wherein the multi-phase step-down DC-DC converter with the two-phase smart power stages further comprises:

a current sense integration circuit configured to sense a current of each phase of the first two-phase smart power stage and second two-phase smart power stage, wherein the current sense integration circuit is configured to sum sensed currents for two phases of the first two- phase smart power stage and sum sensed currents for two phases of the second two-phase smart power stage, wherein the summed sensed currents from the first two-phase smart power stage and the second two-phase smart power stage are received by the multiphase controller.

6. The multi-phase step-down DC-DC converter with the two-phase smart power stages according to claim 5, wherein the multi-phase step-down DC-DC converter with the two-phase smart power stages further comprises:

a PWM distribution circuit configured to:

receive the first pulse width modulation signal from the multiphase controller, generate 180 degrees interleaved PWM signals, a first phase PWM signal and a second phase PWM signal, from the first pulse width modulation signal, wherein the first phase PWM signal controls operation of the first high side switch and the first low side switch, and the second phase PWM signal controls operation of the second high side switch and the second low side switch.

7. A method for modifying DC voltage, the method comprises:

providing a multi-phase step-down DC-DC converter with two-phase smart power stages comprising:

a first two-phase smart power stage, the first two-phase smart power stage comprises a first high side switch, a second high side switch, a first low side switch, a second low side switch, a first switching capacitor, a first inductor, and a second inductor, a second two-phase smart power stage, the second two-phase smart power stage comprises a third high side switch, a fourth high side switch, a third low side switch, a fourth low side switch, a second switching capacitor, a third inductor, and a fourth inductor, and a multiphase controller configured to generate interleaved a first pulse width modulation signal for the first two-phase smart power stage and a second pulse width modulation signal for the second two-phase smart power stage, wherein:

a first leg of the first high side switch and a first leg of the third high side switch are electrically connected to a first terminal, a second leg of the first high side switch, a first leg of the first switching capacitor, and a first leg of the second high side switch are electrically connected to a second terminal, a second leg of the first switching capacitor, a first leg of the first low side switch, and a first leg of the first inductor are electrically connected to a third terminal, a second leg of the first inductor is electrically connected to a fourth terminal, a second leg of the second high side switch, a first leg of the second low side switch, and a first leg of the second inductor are electrically connected to a fifth terminal, a second leg of the second inductor is electrically connected to the fourth terminal, a second leg of the third high side switch, a first leg of the second switching capacitor, and a first leg of the fourth high side switch are electrically connected to a sixth terminal, a second leg of the second switching capacitor, a first leg of the third low side switch, and a first leg of the third inductor are electrically connected to a seventh terminal, a second leg of the third inductor is electrically connected to the fourth terminal, a second leg of the fourth high side switch, a first leg of the fourth low side switch, and a first leg of the fourth inductor are electrically connected to an eighth terminal, and a second leg of the fourth inductor is electrically connected to the fourth terminal, and wherein the multiphase controller is configured such that:

leading edges of two consecutive pulses of a drain-to-source voltage of the first low side switch are aligned with leading edges of a first pulse and a third pulse of the first pulse width modulation signal, respectively;

leading edges of two consecutive pulses of a drain-to-source voltage of the second low side switch are aligned with leading edges of a second pulse and a fourth pulse of the first pulse width modulation signal, respectively, and wherein the first pulse, the second pulse, the third pulse and the fourth pulse of the first pulse width modulation signal are four consecutive pulses;

leading edges of two consecutive pulses of a drain-to-source voltage of the third low side switch are aligned with leading edges of a first pulse and a third pulse of the second pulse width modulation signal, respectively; and leading edges of two consecutive pulses of a drain-to-source voltage of the fourth low side switch are aligned with leading edges of a second pulse and a fourth pulse of the second pulse width modulation signal, respectively, and wherein the first pulse, the second pulse, the third pulse and the fourth pulse of the second pulse width modulation signal are four consecutive pulses.

8. The method according to claim 7, wherein the first terminal is further electrically connected to a voltage input source.

9. The method according to claim 8, wherein the fourth terminal is further electrically connected to a capacitor and a load.

10. The method according to claim 7, wherein the first high side switch, the second high side switch, the first low side switch, the second low side switch, the third high side switch, the fourth high side switch, the third low side switch, and the fourth low side switch are MOSFETs.

11. The method according to claim 7, wherein the multi-phase step-down DC-DC converter with two-phase smart power stages further comprises:

a current sense integration circuit configured to sense a current of each phase of the first two-phase smart power stage and the second two-phase smart power stage, wherein the current sense integration circuit is configured to sum sensed currents for two phases of the first two-phase smart power stage and sum sensed currents for two phases of the second two-phase smart power stage, wherein the summed sensed currents from the first two-phase smart power stage and the second two-phase smart power stage are received by the multiphase controller.

12. The method according to claim 11, wherein the multi-phase step-down DC-DC converter with two-phase smart power stages further comprises:

a PWM distribution circuit configured to:

receive the first pulse width modulation signal from the multiphase controller, generate 180 degrees interleaved PWM signals, a first phase PWM signal and a second phase PWM signal, from the first pulse width modulation signal, wherein the first phase PWM signal controls operation of the first high side switch and the first low side switch, and the second phase PWM signal controls operation of the second high side switch and the second low side switch.

* * * * *